(12) United States Patent
Caspari et al.

(10) Patent No.: US 9,551,326 B2
(45) Date of Patent: Jan. 24, 2017

(54) APPARATUS FOR ROUTING CABLES IN WIND TURBINES

(71) Applicant: Hydac Accessories GmbH, Sulzbach/Saar (DE)

(72) Inventors: Jochen Caspari, St. Wendel (DE); Rainer Even, Saarbrücken (DE); Helmut Hiss, Ispringen (DE); Peter Maryniok, Mettlach (DE); Martin Schmitt, Knopp-Labach (DE)

(73) Assignee: HYDAC ACCESSORIES GMBH, Sulzbach/Saar (DE)

( * ) Notice: Subject to any disclaimer, the term of this patent is extended or adjusted under 35 U.S.C. 154(b) by 0 days.

(21) Appl. No.: 14/429,879

(22) PCT Filed: Sep. 30, 2013

(86) PCT No.: PCT/EP2013/002931
§ 371 (c)(1),
(2) Date: Mar. 20, 2015

(87) PCT Pub. No.: WO2014/053230
PCT Pub. Date: Apr. 10, 2014

(65) Prior Publication Data
US 2015/0222106 A1  Aug. 6, 2015

(30) Foreign Application Priority Data

Oct. 4, 2012 (DE) .......... 10 2012 019 490
Oct. 4, 2012 (DE) .......... 10 2012 019 493

(51) Int. Cl.
*H02G 3/00* (2006.01)
*H02G 3/30* (2006.01)
(Continued)

(52) U.S. Cl.
CPC ........... *F03D 80/85* (2016.05); *F03D 80/80* (2016.05); *F16L 3/08* (2013.01); *H01B 3/28* (2013.01);
(Continued)

(58) Field of Classification Search
CPC ............ H02G 3/22; H02G 3/26; H02G 3/28; H02G 3/30; H02G 7/00; H02G 11/00; H02G 11/02; F03D 9/003; F03D 80/85; H01B 17/583; H01B 17/58; H01B 17/586; H01B 3/28; F16L 3/08; F16L 3/1215; B66D 1/36
(Continued)

(56) References Cited

U.S. PATENT DOCUMENTS 4,234,165 A * 11/1980 Murray .................. F21V 21/38
248/157
4,381,422 A * 4/1983 Traini .................... H02G 7/125
174/146
(Continued)

FOREIGN PATENT DOCUMENTS

DE   1 615 826 B      12/2005
DE   20 2006 006 347   7/2006
(Continued)

*Primary Examiner* — Dimary Lopez Cruz
(74) *Attorney, Agent, or Firm* — Wenderoth, Lind & Ponack, L.L.P.

(57) ABSTRACT

An apparatus for routing cables in wind turbines has a plurality of bushings (17) for cables distributed on at least one base body (3, 5) that has a preferably round contour. The bushings (17) are provided with a guiding arrangement (27; 38; 39, 41; 43; 48) permitting the cables to move relative to the part of the bushing (17) that surrounds the guiding arrangement.

14 Claims, 16 Drawing Sheets

(51) Int. Cl.
*F16L 3/08* (2006.01)
*H02G 3/32* (2006.01)
*H01B 3/28* (2006.01)
*H02G 3/22* (2006.01)
*F03D 9/00* (2016.01)
*H01B 17/58* (2006.01)

(52) U.S. Cl.
CPC ............... *H02G 3/22* (2013.01); *H02G 3/30* (2013.01); *H02G 3/32* (2013.01); *F03D 9/003* (2013.01); *F03D 13/20* (2016.05); *H01B 17/583* (2013.01); *Y02E 10/722* (2013.01)

(58) Field of Classification Search
USPC .......... 416/244 R; 290/44, 55; 174/650–659, 174/146, 99 R, 100
See application file for complete search history.

(56) References Cited

U.S. PATENT DOCUMENTS

| | | | | |
|---|---|---|---|---|
| 5,225,648 | A * | 7/1993 | Torii | B23K 26/0884 219/121.6 |
| 5,320,312 | A * | 6/1994 | Hoenninger | F16L 3/227 211/107 |
| 6,215,065 | B1 * | 4/2001 | Cox | H02G 3/22 174/656 |
| 6,528,721 | B1 * | 3/2003 | Dane | H02G 7/14 174/40 CC |
| 6,713,891 | B2 * | 3/2004 | Kirkegaard | F03D 11/0066 290/44 |
| 7,534,965 | B1 * | 5/2009 | Thompson | H02G 3/22 16/2.1 |
| 7,806,629 | B2 * | 10/2010 | McCoy | H02G 9/06 211/60.1 |
| 7,982,330 | B1 * | 7/2011 | Ueno | F03D 11/0066 290/44 |
| 8,274,170 | B2 * | 9/2012 | Kassner | F03D 11/00 290/55 |
| 8,366,396 | B2 * | 2/2013 | Barton | F03D 11/0066 416/146 R |
| 8,642,888 | B2 * | 2/2014 | Karlinger | B25J 19/0029 174/70 R |
| 9,051,920 | B2 * | 6/2015 | Prebio | F03D 11/00 |
| 2007/0007397 | A1 * | 1/2007 | Nelson | F16L 3/2235 248/68.1 |
| 2007/0234559 | A1 * | 10/2007 | Tokuda | B60K 7/0007 29/755 |
| 2007/0246613 | A1 * | 10/2007 | Kennedy | H02G 3/32 248/56 |
| 2009/0218451 | A1 | 9/2009 | Lundborg | |

FOREIGN PATENT DOCUMENTS

| | | | |
|---|---|---|---|
| DE | 60 2005 002 793 | | 8/2008 |
| DE | 10 2010 032 687 A1 | | 2/2012 |
| DE | 102011012391 A | * | 8/2012 |
| DE | 10 2010 040 446 | | 10/2012 |
| EP | 1 605 568 A1 | | 12/2005 |
| JP | 2005137097 A | * | 5/2005 |
| JP | 2008-298051 A | | 11/2008 |
| WO | WO 2010/108538 A1 | | 9/2010 |

\* cited by examiner

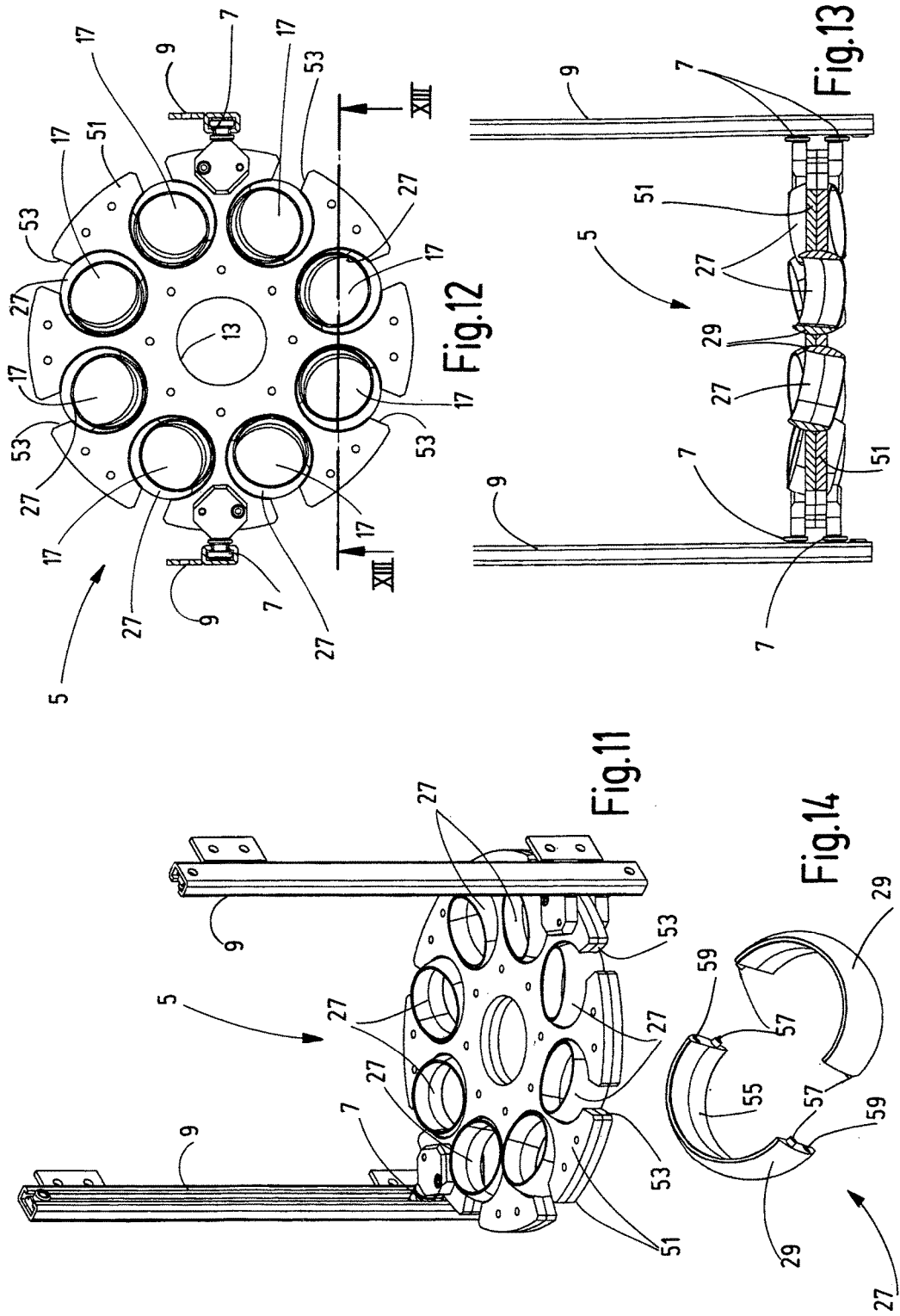

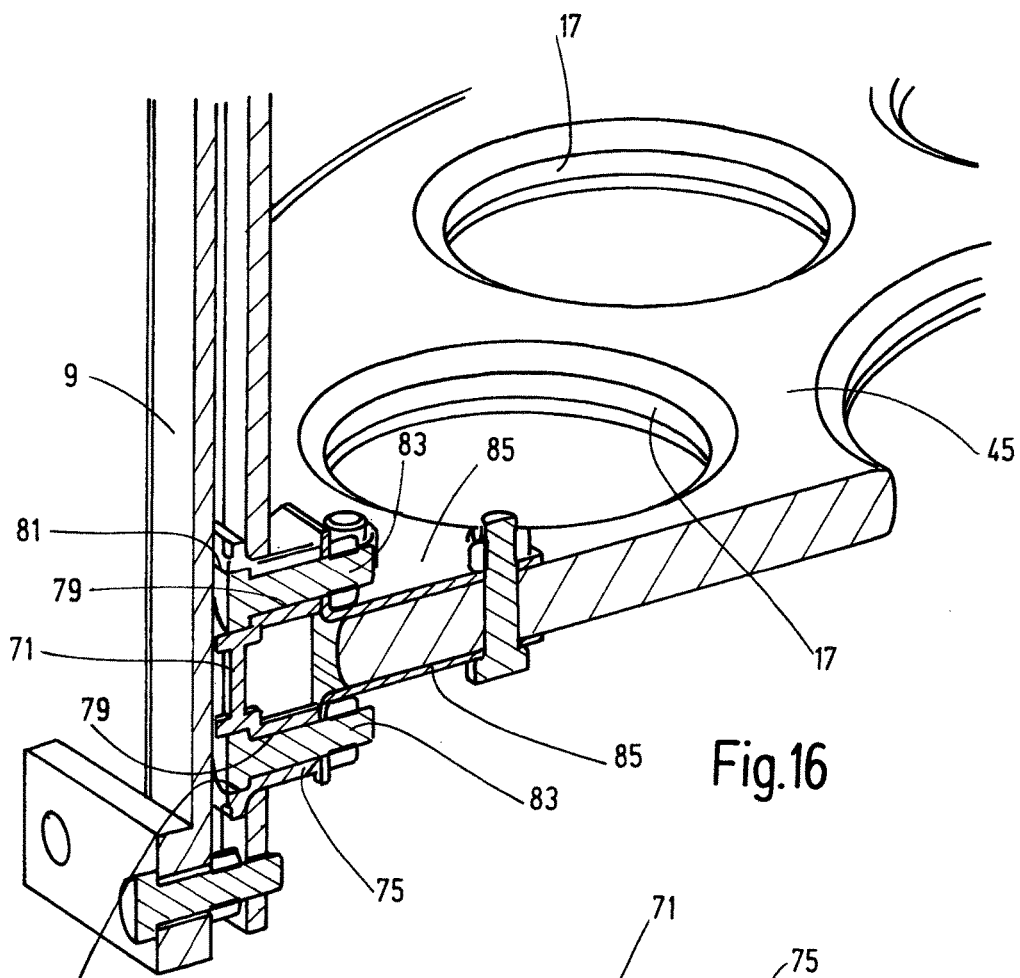
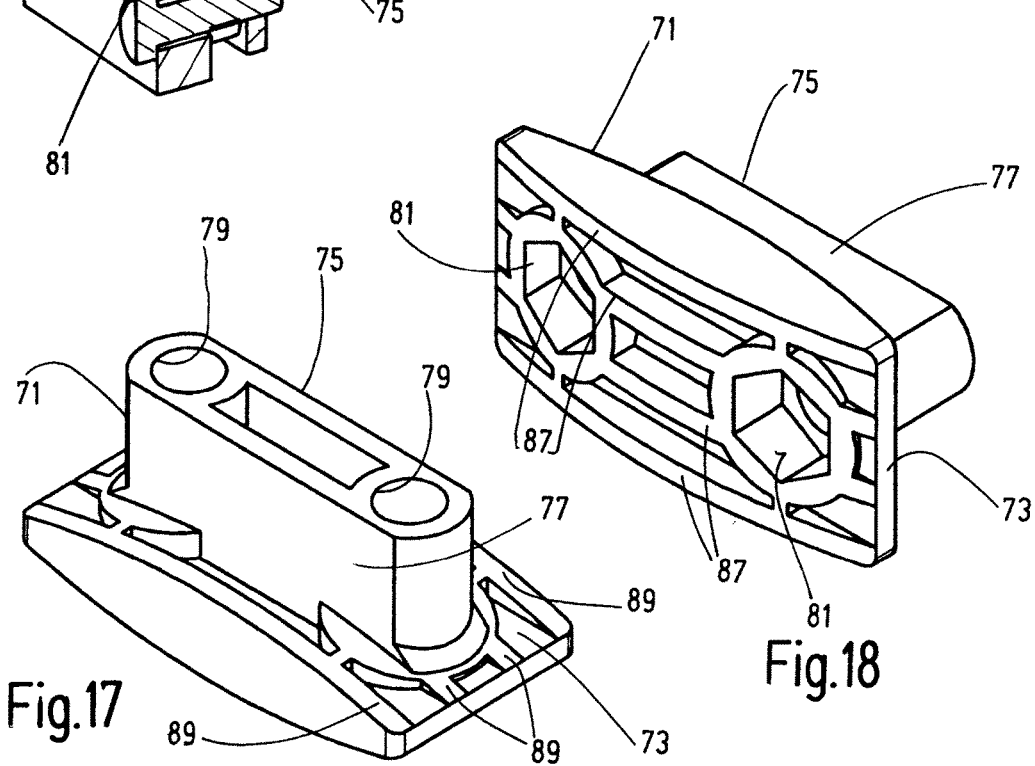
Fig.16
Fig.17
Fig.18

APPARATUS FOR ROUTING CABLES IN WIND TURBINES

FIELD OF THE INVENTION

The invention concerns an apparatus for routing cables in wind turbines, in which on at least one base body having a preferably circular outline, multiple cable bushings are distributed.

BACKGROUND OF THE INVENTION

For the purpose of discharging the energy generated in wind turbines, as well as for other operational purposes such as control, monitoring etc., the cables that extend down through the tower from the nacelle must be routed such that when the cables, which hang in form of cable bundles from the nacelle inside the tower, move during operation they are not damaged or impaired in any way. Since in commonly used wind turbines the nacelle with the generator unit, from which the cable bundle hangs inside the tower, can make up to three turns before the nacelle is driven back, the cable bundle must be routed such that the cables inside the bundle, hanging in the tower, are, on the one hand, able to follow the movement, but, on the other hand, do not chafe against each other to the degree that the insulation may be damaged.

To this end, in the prior art, for example as described in WO 2011/151465 A2, the cables are led, spaced from each other, from the rotatable nacelle in a cable bundle to a base body that is non-rotatably supported inside the tower. The cables are fed through bushings arranged on the base body. The bushings are disposed in the base body, spaced from each other, so that the cables inside the bundle are also spaced from each other. As the bundle twists with the rotating movement of the nacelle, the danger of chafing between the cables is largely prevented. Nevertheless, the sudden change in direction of the cables, which is caused by the twisting of the bundle at the location where the cable exits the bushings of the base bodies, leads to undue local stress on the cables and their insulation.

SUMMARY OF THE INVENTION

An object of the invention to provide an improved guiding apparatus that ensures the best possible protection of the cables during the twisting movements of the cable bundle.

This object is basically achieved according to the invention by an apparatus where the bushings are provided with a guiding arrangement, which permits cable movements relative to the part of the bushing that surrounds the guiding arrangement. This arrangement prevents the cables from being forced at the exit from the bushing into a sudden change in direction that is similar to kinking, since the free movement within the bushing permits a gradual change in direction.

In particularly advantageous exemplary embodiments, the respective guiding arrangement is provided with an insert that surrounds the cable passing through. The insert is moveably supported in the respective bushing relative to the base body.

In particularly preferred exemplary embodiments the insert is made in form of an annular body that surrounds the cable passing through it. The outside surface of the annular body forms part of a convex, spherical surface on which a part of a wall of the inside of the bushing is supported, forming a spherical cap. This structure creates a ball joint-shaped guide for the cable, providing the cable with freedom to move around any axes.

Alternatively, the guiding arrangement can be fitted with an elastomeric, annular body that flexibly surrounds the cable in the bushing, preferably made of a synthetic rubber material. The guiding of the cable through a type of collar can be achieved with little effort and is a very cost-effective solution.

According to a further advantageous exemplary embodiment, the guiding arrangement is provided with a swivel bearing for the cable passing through. To this end the arrangement may be implemented with particular advantage in that the swivel bearing is provided with a needle bearing, with its inner ring surrounding the passing cable and its outer ring fixed to the base body. This structure allows the cables that pass through it to adjust their turning position to the rotating movements of the bundle in a particularly gentle manner.

In an alternative exemplary embodiment the guiding arrangement may comprise rotatable roller bodies that are arranged such that they form lateral boundaries of the cable passage of the respective bushing. Hence, the bushing for the passing cable is provided with moveable walls.

In a particularly simple and cost-effective solution, the bushings can be formed by circular openings in a circular disk that forms the base body. The guiding arrangement is formed by the openings in the base body. The wall of the openings curve and expand outwards on both sides. Thus, each cable that passes through the bushing is able to adjust to any inclination relative to the plane of the base body.

In a further modified exemplary embodiment, the base body is provided, along its circular circumference, with adjacently located holding fixtures that are radially open in outward direction. The holding fixtures are provided for the purpose of inserting and retaining bushings whose cable passages can be opened to allow the insertion of the respective cable. Such exemplary embodiments are characterized by being particularly easy to install, since the threading of individual bundle elements through closed cable passages is not necessary. This structure also enables easy retrofitting in existing plants.

In particularly advantageous exemplary embodiments, the bushings are formed by two partial bodies that delimit the opening of the cable passage so that the cable passages can be opened. The two partial bodies can be locked in the respective holding fixture in a position that closes the opening.

The partial bodies may be shaped as identical parts, each of which forms one half of the bundle bushing.

To securely lock the bushings in the holding fixtures, advantageous exemplary embodiments are provided with a locking strap that surrounds the circumference of the base body and fits tightly against the bushings, in radial direction on the outside located, partial bodies of the bushings.

To account for the cable bundle becoming shorter as it twists, particularly advantageous exemplary embodiments provide at least one base body. Attached to the swiveling nacelle located on the tower of the respective wind turbine. At least one base body disposed further down is attached such that it is non-rotatable and vertically moveable inside the tower.

In this respect, particularly advantageously, radially protruding rollers are provided on the edge of the vertically moveable base body at diametrically opposed locations. The rollers are guided in vertical runners inside the tower. The base body is thus non-rotatably supported with respect to the tower, but it is able to assume the appropriate vertical position depending on the respective length of the cable bundle.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 11 is a perspective view of a base body according to a seventh exemplary embodiment of the apparatus of the invention, similar to that of FIG. 3;

FIG. 12 is a plan view of the base body of FIG. 11;

FIG. 13 is a side view in section taken along line XIII-XIII of FIG. 12;

FIG. 14 is a separated perspective view of an annular body in a two-part design of FIG. 11;

FIG. 16 is an enlarged partial perspective view in section of the exemplary embodiment of FIG. 15;

FIGS. 17 & 18 are perspective views of the sliders provided in the embodiment of FIGS. 15 and 16, providing the rear view and the front view of the depicted slider, respectively;

DETAILED DESCRIPTION OF THE INVENTION

Figure 1:
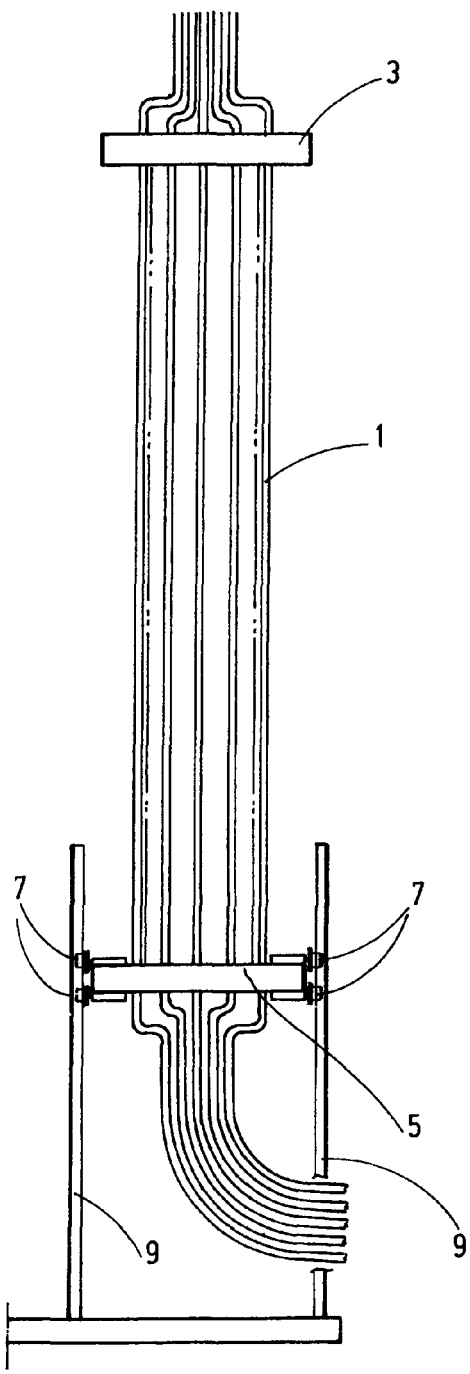
FIG. 1 is a schematically simplified side view of a cable bundle hanging from the nacelle of a wind turbine inside the tower and guided by an apparatus according to an exemplary embodiment of the invention.
Figure 2:
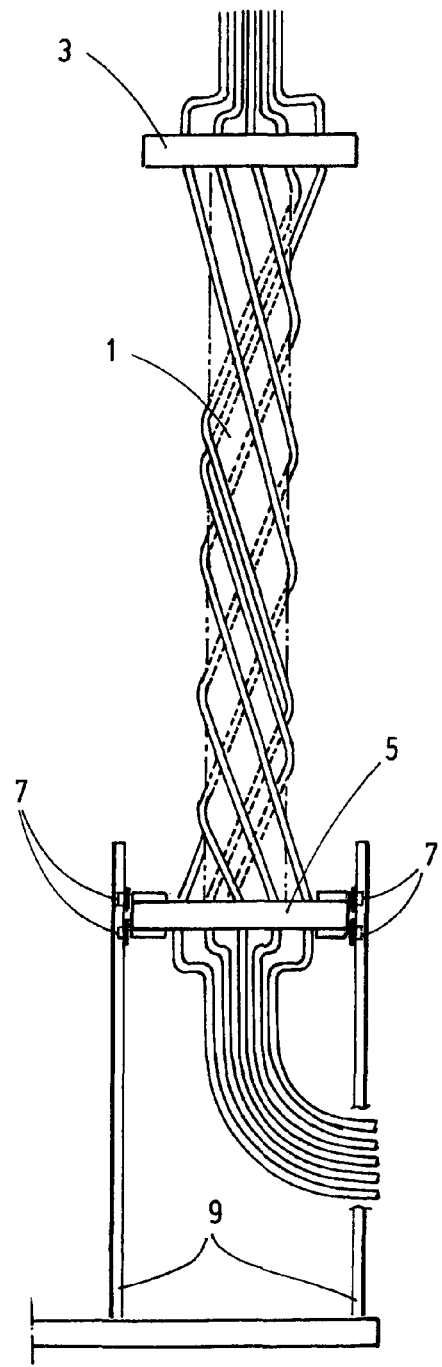
FIG. 2 is a schematically simplified side view of the cable bundle of FIG. 1 shown in a twisted state.

FIGS. 1 and 2 depict an exemplary embodiment of the guiding arrangement according to the invention, showing only a cable bundle 1 handing from a nacelle into a tower. The components of the guiding arrangement according to the invention that interact with the cable bundle 1. The remaining components of the respective wind turbine, such as nacelle, rotor, tower etc. are not shown in the present drawings since they may be of a standard design. The cable bundle 1 is guided between an upper base body 3 attached to the rotatable nacelle (not shown) and is vertically unmovable, and a lower base body 5 non-rotatably fixed to the tower (not shown) but vertically moveable.

To this end a pair of rollers 7 is provided on each of diametrically opposed locations of the lower base body 5. The rollers 7 of each pair are vertically offset to one other and are guided in runners 9 that are attached to the tower and extend in vertical direction. While in FIG. 1 the cable bundle 1 is shown in a non-twisted, stretched state, FIG. 2 shows the state in which the nacelle, and thus the upper base body 3, have swiveled so that the cable bundle 1 is twisted. Due to the shortening of the cables caused by the twisting, the lower base body 5 in FIG. 2 has moved vertically upwards along runners 9 to compensate for the change in length. The design of the upper base body 3 can be the same as that of the lower base body 5 with the exception that rollers 7 with the respective brackets are attached to the lower base body 5.

Figure 4:
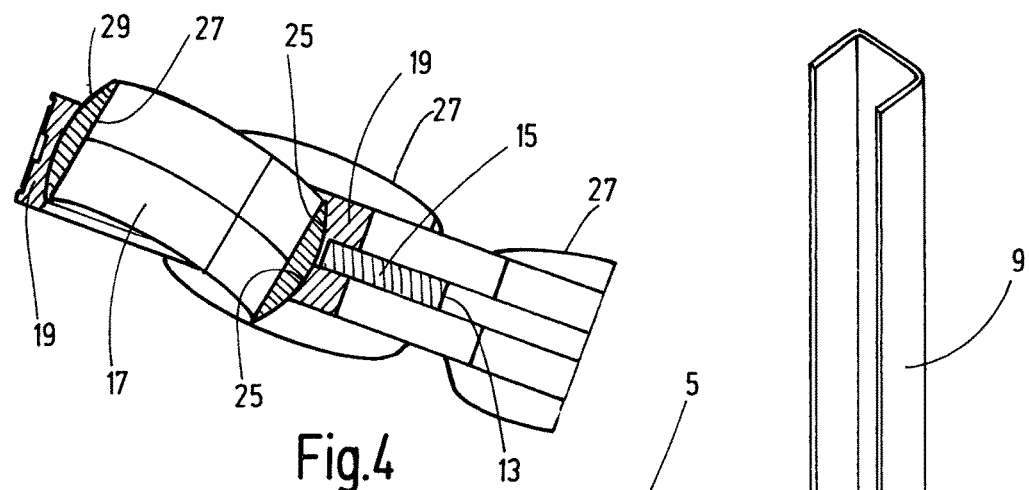
FIG. 4 is an enlarged, partial side view in section of the base body taken along line IV-IV of FIG. 3.
Figure 3:
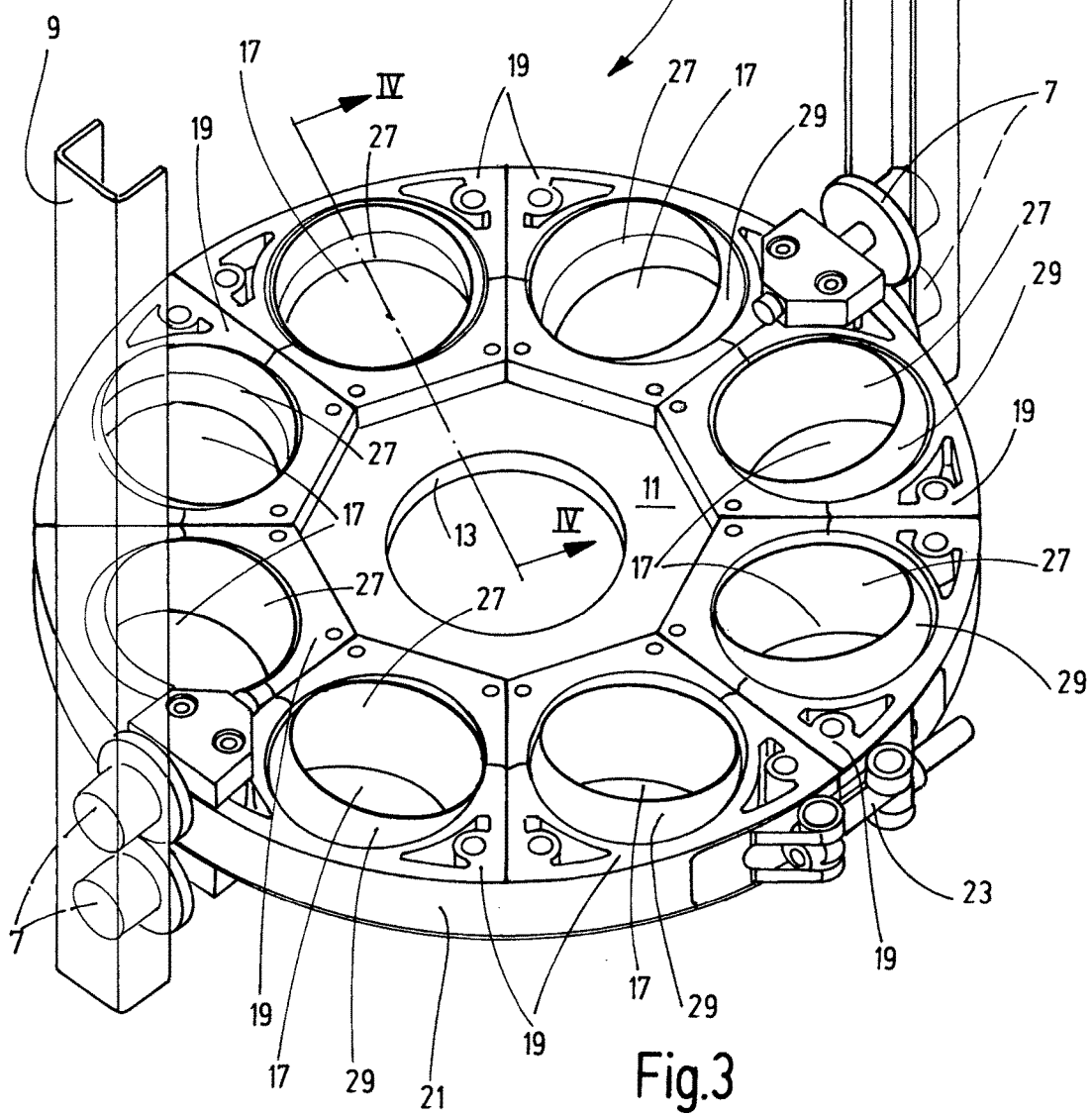
FIG. 3 is a perspective view of a base body according to a first exemplary embodiment of the apparatus according to the invention, in which the base body is supported non-rotatably and vertically moveable inside the tower.

FIGS. 3 and 4 show the design of the base body 5 according to a first exemplary embodiment of the apparatus according to the invention in greater detail. The base body 5 comprises an intermediate body in form of a disk 11, which, starting from a center section with a central opening 13, is provided with radially outwardly extending spokes 15 (see FIG. 4). Spokes 15 leave room between them for bushings 17, which in the present example has eight bushings 17 evenly distributed along a circle. The bushings 17 are each formed between the spokes 15 by circle segments 19, which are secured from both sides to disk 11. The circle segments 19 fit together neatly without gaps therebetween. Due to their arc-shaped peripheral edge, circle segments 19 provide the base body 5 with a circular outline or periphery. To ensure that the circle segments 19 form a ring structure where the abutting circle segments 19 are locked together, a locking strap 21 is placed around the outer circumference of the structure, which locking strap 21 can be tensioned by a turnbuckle 23.

As is most clearly apparent from FIG. 4, the wall 25 of the circle segments 19, which delimits the cable passage of the formed bushing 17, has a concave shape that forms a portion of a spherical cap. An insert, which surrounds the cable that passes through the respective bushing 17, takes the shape of an annular body 27 the outside of which forms part of a convex spherical surface 29 (see FIG. 4). The annular body 27 lies against the concave wall 25 of circle segment 19. Thus, the annular body 27, which forms the insert, is supported on the respective base body 3, 5 like a ball joint so that the cable running through the bushings 17 can take on any inclination with respect to the plane of the base body 3, 5 and can also twist together with the insert (annular body 27).

Figure 5:
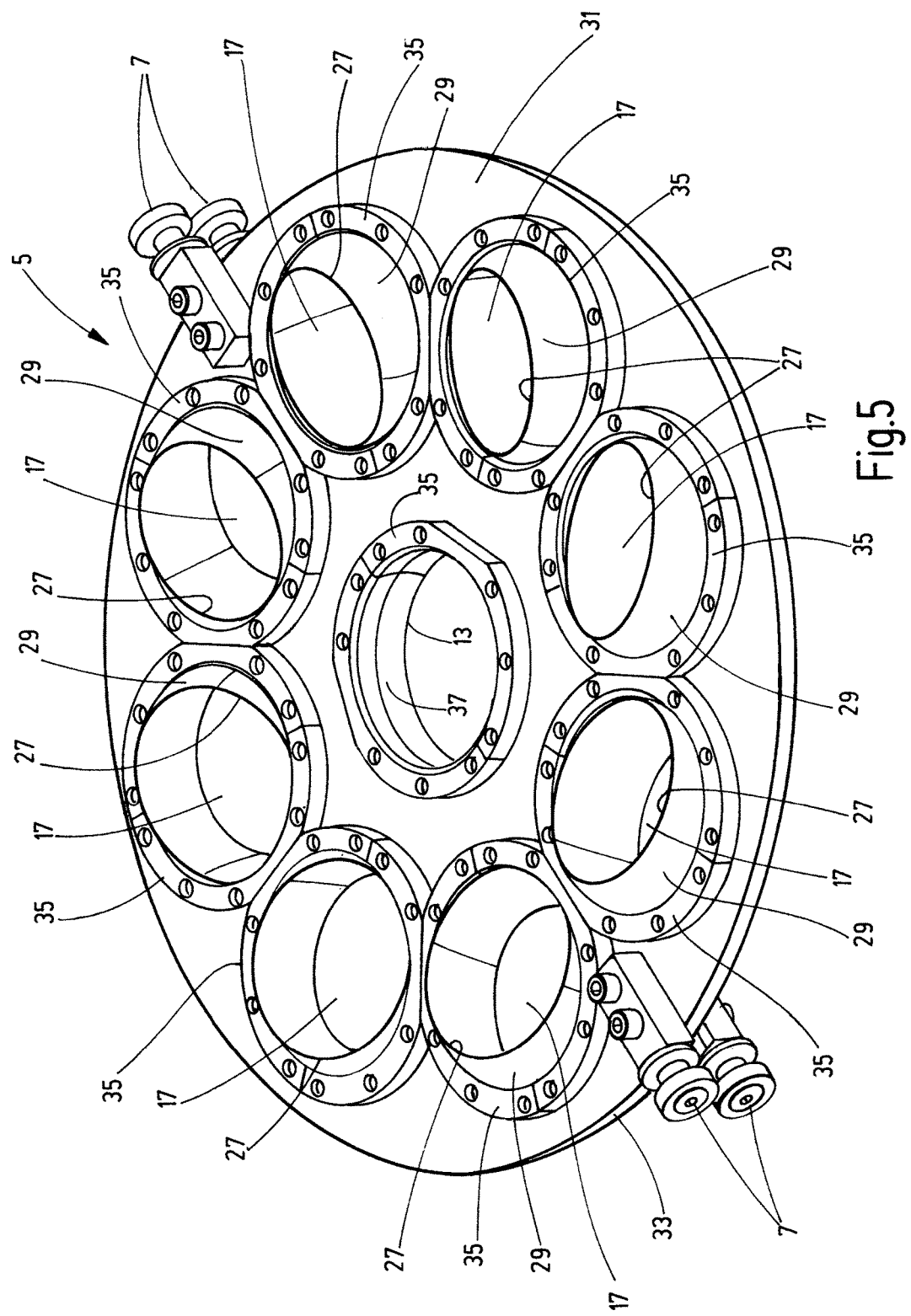
FIG. 5 is a perspective view of a base body according to a second exemplary embodiment of the apparatus according to the invention.
Figure 6:
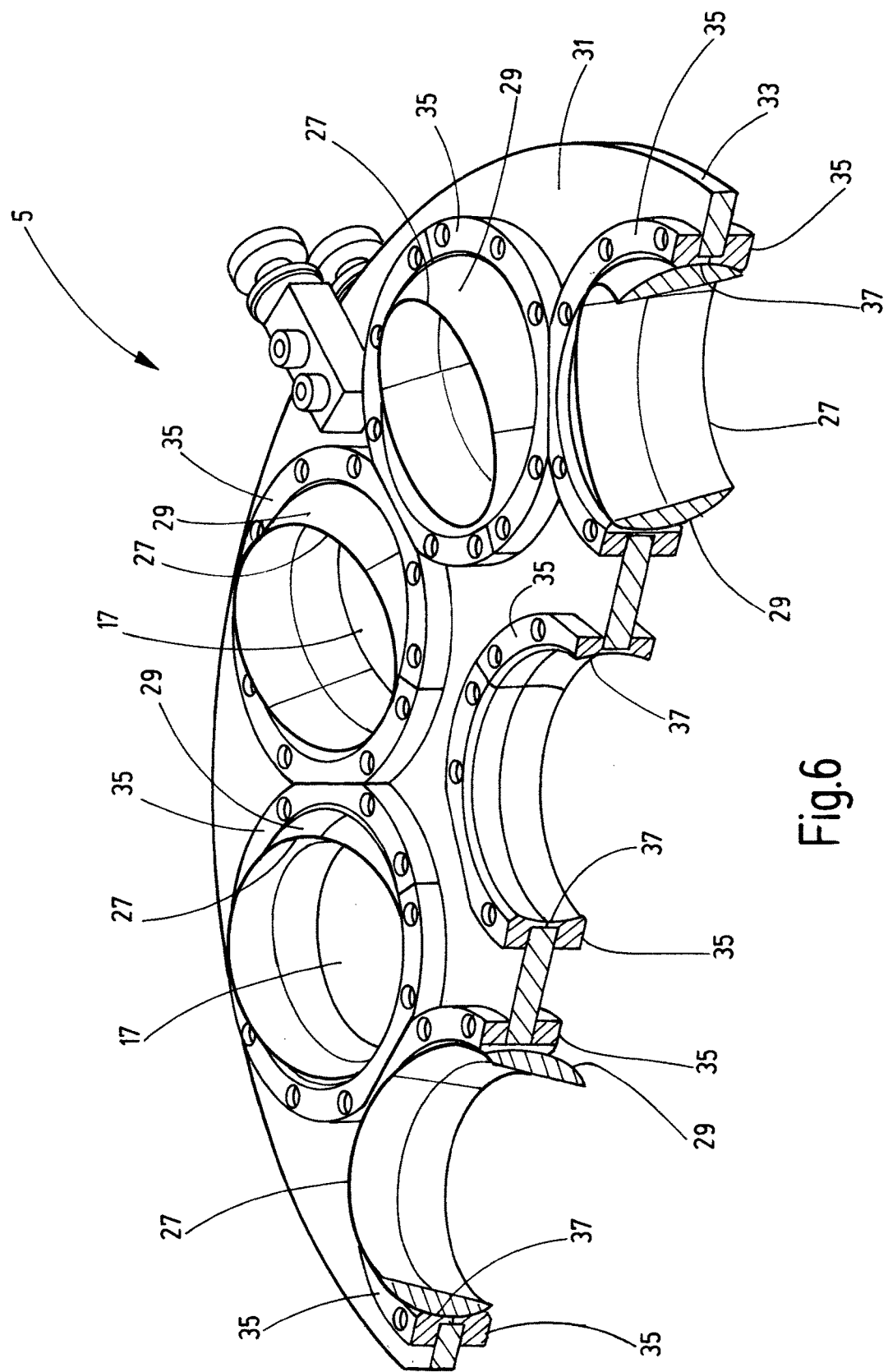
FIG. 6 is a perspective view in section of the base body of FIG. 5.

FIGS. 5 and 6 depict a further exemplary embodiment, which differs from the previously described example mainly in that a disk 31 is provided that is not star-shaped, as is the case with the disk 11 of the previously described example, but forms with the outer edge 33 itself the circular outline of the base body 3, 5. Apart from the central opening 13, further openings in disk 31 are provided to form the bushings 17. As in the previously described example, the guiding arrangement of the bushings 17 is each formed by an insert in form of an annular body 27, the outside of which is again part of a spherical surface 29.

In the example of FIGS. 5 and 6, ring elements 35 are attached to the lower and upper sides of the disk 31, instead of the circle segments 19 provided in the previously described example. The ring elements 35 again are provided, like the circle segments 19 of FIGS. 3 and 4, with internally concave walls 37 so that the annular bodies 27 are supported similar to ball joints. This embodiment does not provide a locking strap that surrounds the circumferential edge 33 of the disk 31. A further difference is that the central opening 13 of disk 31 can also be used to form a bushing 17 because this opening 13 is also provided with ring elements 35 with a cap-like curved inner wall 37. A ball joint-like guiding arrangement can then be formed through inserted annular bodies 27.

Figure 7:
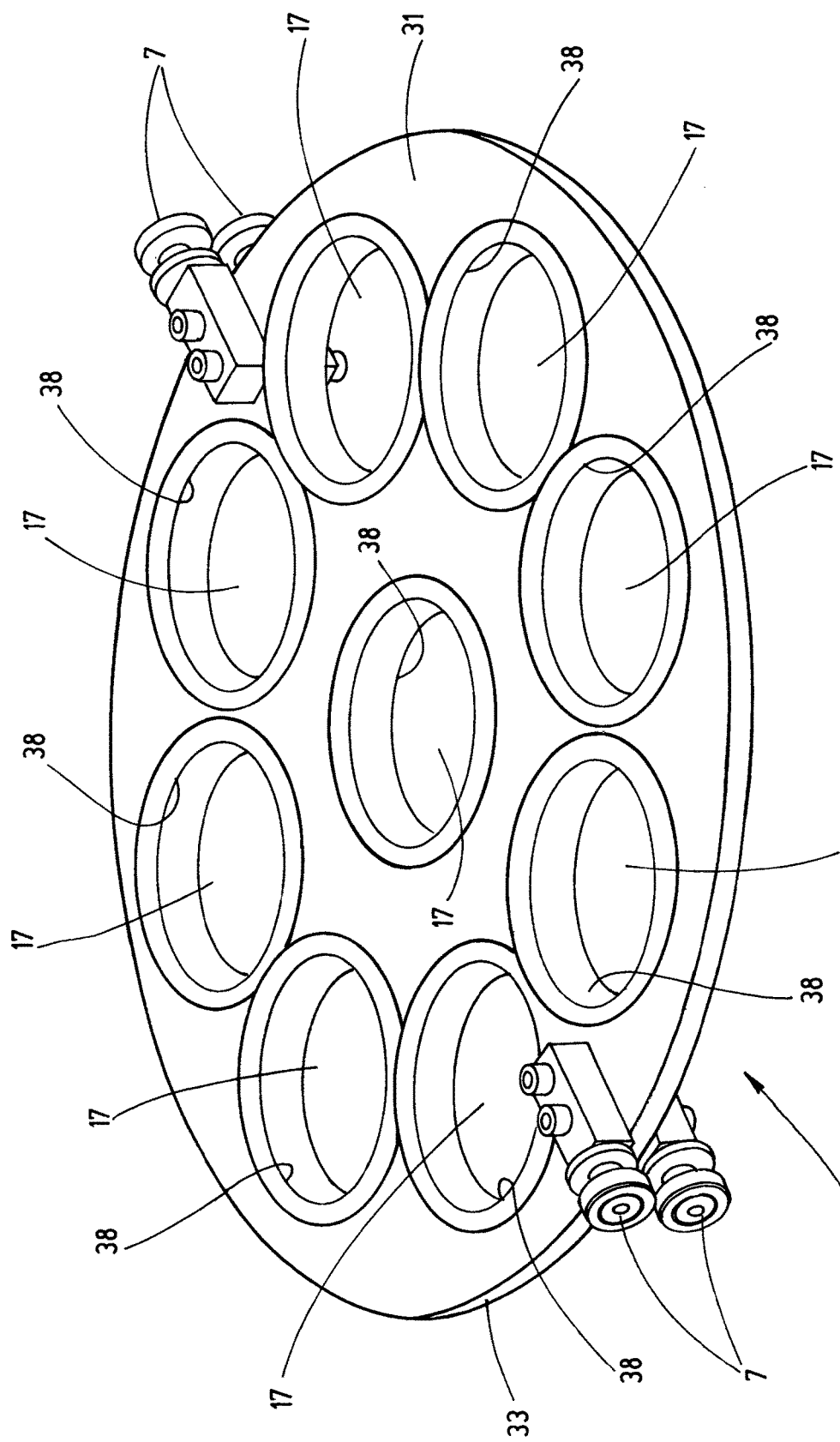
FIG. 7 is a perspective view of a base body according to a third exemplary embodiment of the apparatus according to the invention.

FIG. 7 shows a further modified exemplary embodiment in which, again, a disk 31 is provided with an outer edge 33 that determines the circular outline. A rubber ring is inserted as a guiding arrangement into each of the openings provided for the bushings 17. This structure provides flexible guidance for the cable in an elastomeric collar so that the cable is able to assume the required inclination with respect to the plane of disk 31.

Figure 8:
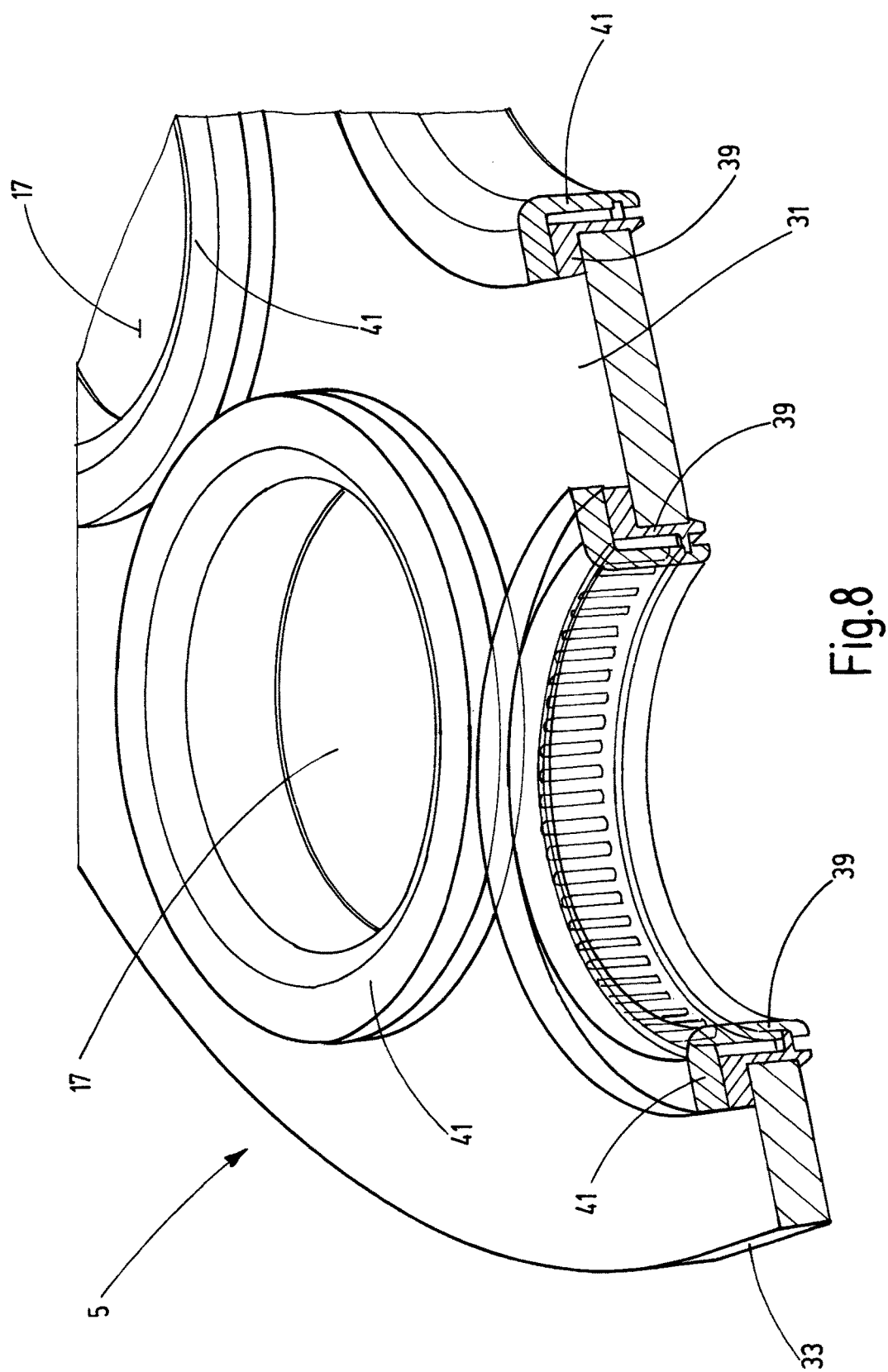
FIG. 8 is an enlarged partial perspective view in section of the base body according to a fourth exemplary embodiment of the apparatus of the invention.

In a further exemplary embodiment shown in FIG. 8, a disk 31 with a circumferential edge 33 is provided. The guiding arrangement of the bushings 17 is formed in each case through a swivel bearing for the cable bundle, in which a needle bearing is provided The outer ring 39 of each needle bearing is fixed to the disk 31. Its inner ring 41 surrounds the respective cable bundle.

Figure 9:
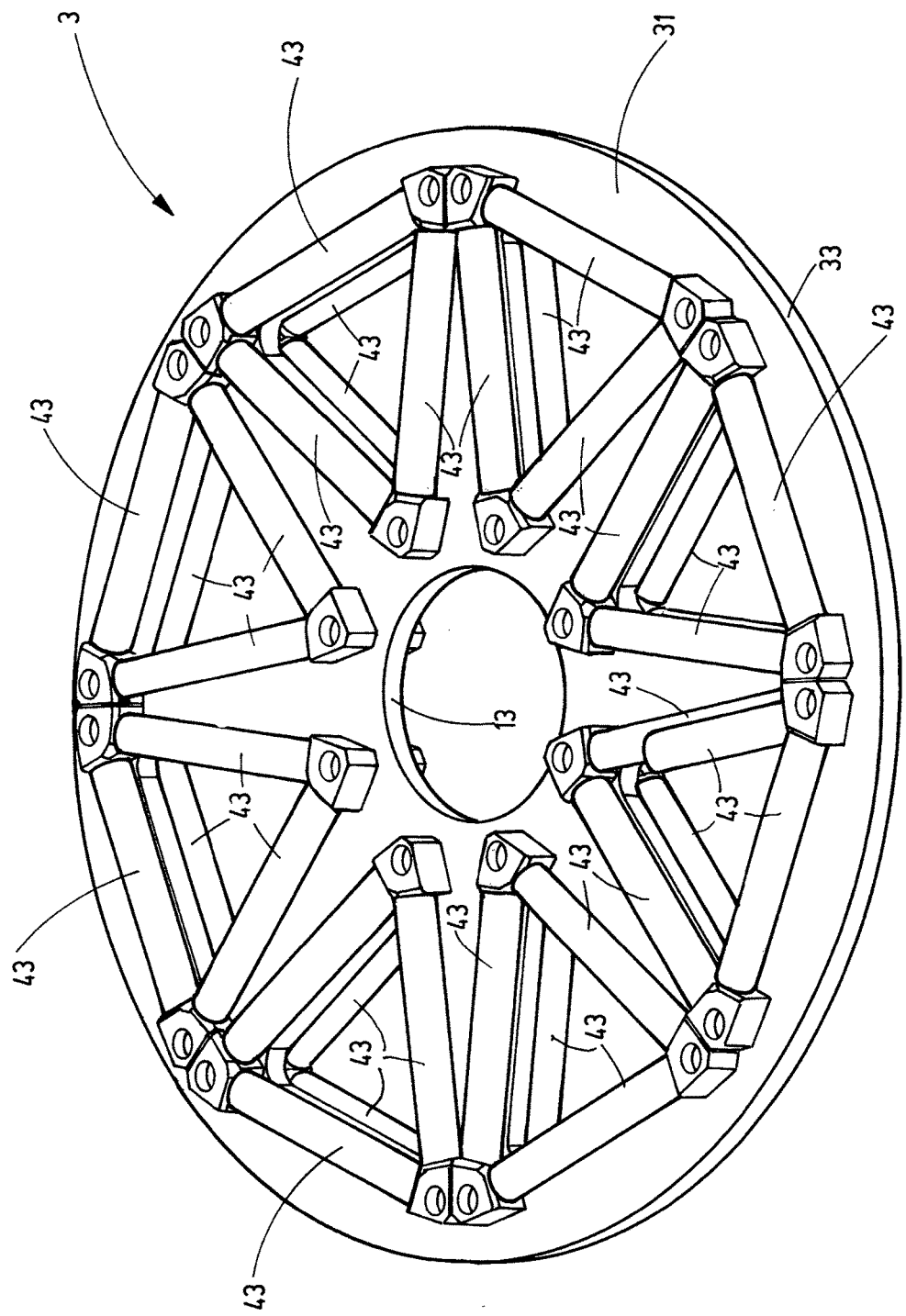
FIG. 9 is a perspective view of a base body according to a fifth exemplary embodiment of the apparatus of the invention.

FIG. 9 shows a further modified exemplary embodiment in which, again, a disk 31 is provided, which disk defines the circular outline of the base body 3, 5 with its outer edge 33. Triangular-shaped openings are formed in disk 31 for the bushings 17. Rotatable cylindrical roller bodies 43 are arranged on the sides of the triangles, at the top and at the bottom of the disk 31. The cylindrical roller surfaces then form the contact surface for the respective cable passing through it. The guiding arrangement of this design also provides possibilities for the inserted cable to carry out movements relative to the remaining part of the base body 3, 5.

Figure 10:
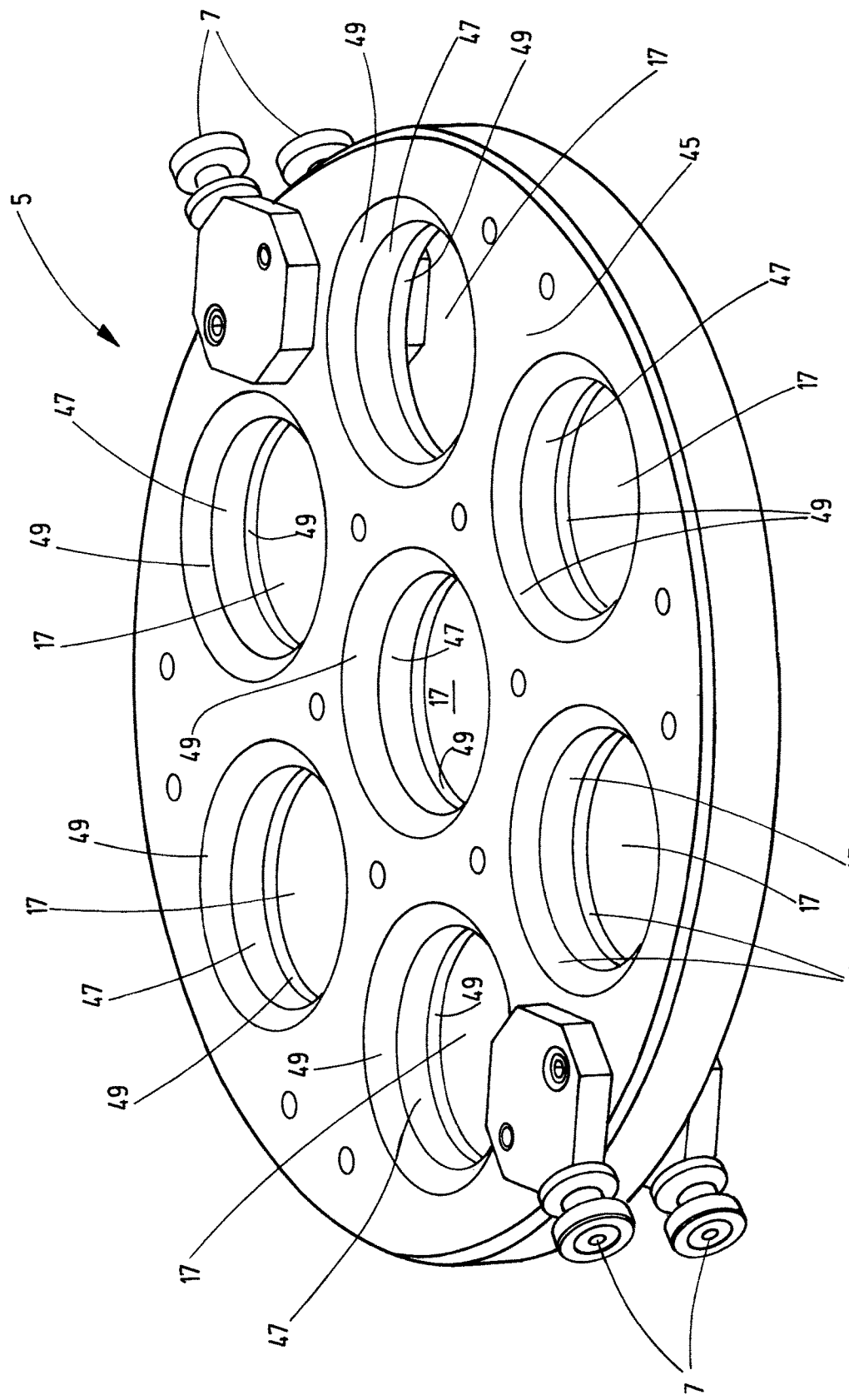
FIG. 10 is a perspective view of a base body according to a sixth exemplary embodiment of the invention.

FIG. 10 depicts an exemplary embodiment that is characterized by a particularly simple design. The single-piece main component of base body 3, 5 is in this instance a circular plate 45 that comprises round openings 47 for the bushings 17. The guiding arrangement for the cables passing through it is in this instance formed by giving the wall of the opening 47 a special shape. Curvatures 49 enlarge the openings 47 towards the outside and thus provide the passing cable with a predefinable inclination on exiting the openings.

The details of the base bodies 3, 5 are described in FIGS. 2 to 8 and 10 with base body 5, being fitted with rollers 7 and being arranged non-rotatably below base body 3, which can rotate together with the nacelle. All of the described designs of the base body without lateral rollers 7 can also be used as the upper base body 3, as shown in the example depicted in FIG. 9.

The FIGS. 11 to 13 show a further exemplary embodiment in which the base body 5 is formed from two identical disks 51 that are arranged one on top of the other. The disks 51 form a star-shaped body with a slot on one side, so that the bushings 17, which are arranged along the perimeter of disks 51, are open to the outside via slots 53 (not all have reference numbers).

FIG. 14 shows a modified embodiment of the annular bodies 27. As depicted, the annular bodies 27 are formed from two identical ring halves 55 that can be attached to each other by pins 57 protruding from the connecting surfaces, and their matching bores 59.

When describing the bushings 17 in base body 3, 5 above, it does not only mean bushings that are arranged inside the base body, but also those that are arranged along the edge (not shown), which provide cable guidance with a further degree of freedom compared to the known, rigid guide designs. Provided that the base body has a slot at the edge in the vicinity of the bushings, the insertion of a cable from the side via the slot is possible.

Figure 15:
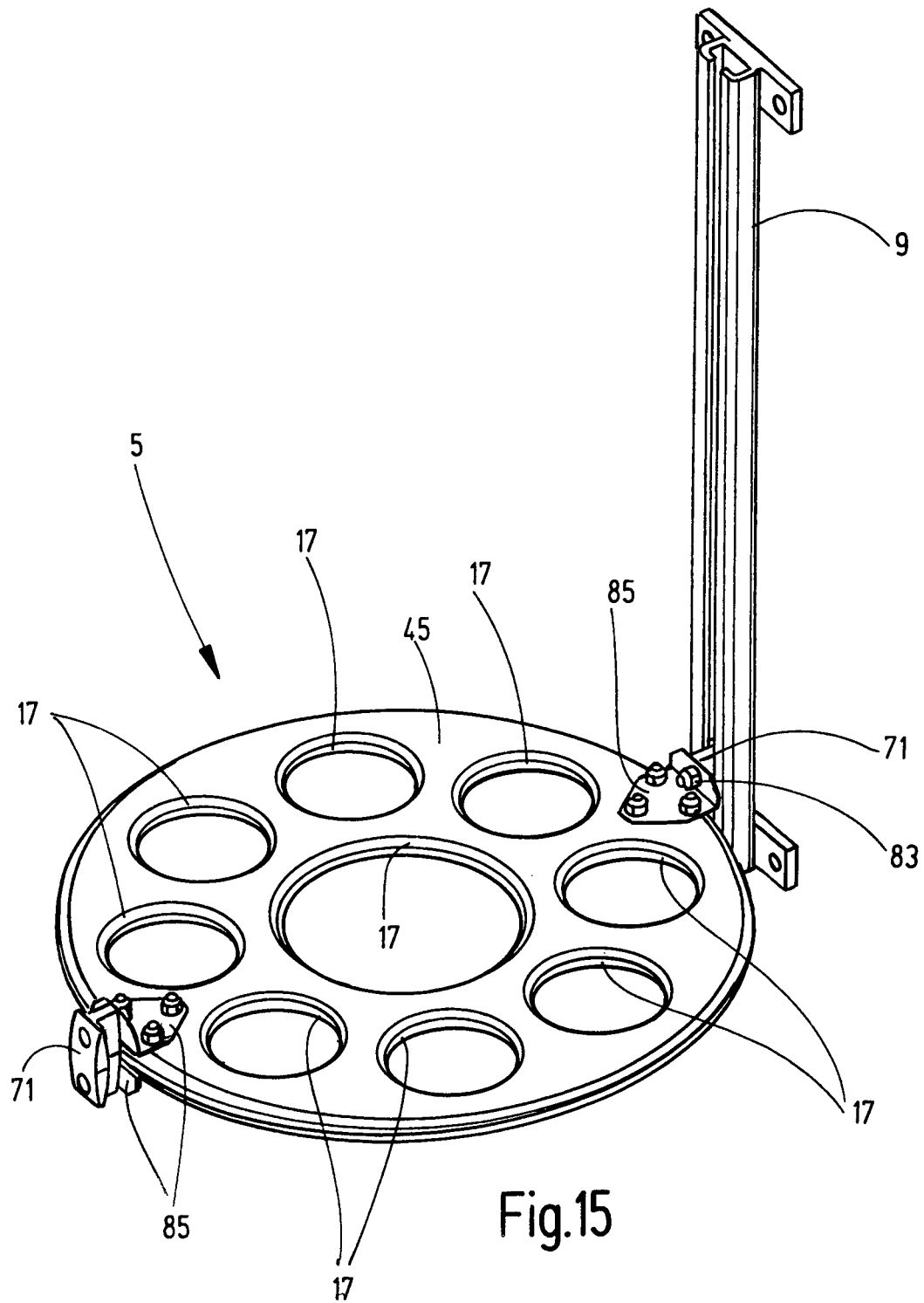
FIG. 15 is a partial perspective view of only the base body and a single runner according to an eighth exemplary embodiment of the invention.

The FIGS. 15 to 18 show a further exemplary embodiment in which the base body 5 is formed by a circular plate 45, as in FIG. 10. In contrast to FIG. 10, however, the plate 45 is not moveably guided by f pairs of rollers 7 on runners 9. Each pair of rollers 7 is replaced by a slider 71 the shape of which can be seen in detail in FIGS. 17 and 18. The runners 9, of which only one is shown in FIGS. 15 and 16, take the shape of a C-shaped cross sectional profile in contrast to the example in FIG. 3, in which the runners 9 are shaped as a U-profile in cross section. The sliders 71 are injection-molded from plastic as a single piece and are comprise a front sliding shoe 73 and a rear guiding part 75. The sliding shoe 73 forms parallel guiding surfaces 77 with which the slider 71 is guided inside the open slot of the C-profile of runners 9. Moreover, the guiding part 75 serves as an attachment having bolt holes 79 extending all the way to the front side of sliding shoe 73 and end in expanded hexagonal recesses 81. Recesses 81 are designed to receive the hexagonal head of mounting bolts 83. As is best seen in FIG. 16, the mounting bolts 83 are used to fasten the respective slider 71 to brackets 85, which are formed from folded sheet metal, and which in turn are bolted to the plate 45.

As shown in FIGS. 17 and 18, the sliders 71 are provided at the front with convex-curved sliding surfaces 87 (FIG. 18) and on the back with corresponding convex-curved sliding surfaces 89 (FIG. 17), with which the sliders 71 are guided along the inner wall of the C-profile of runners 9. The curvature of the sliding surfaces 87 and 89 allows plate 45 to slant to permit a limited angular pulling of the cables, which have been inserted into bushings 17, without tilting.

The FIGS. 19 to 23 show a further exemplary embodiment of the invention, which differs from the previously described examples mainly in that the bushings 17 are designed such that the opening 47, formed to allow the bundle elements to pass through, can be opened. Moreover, the bushings 17 are arranged such on the periphery of the base body 5 that, in the open state of opening 47, bundle elements can be inserted from the outside of the base body 5 before the opening 47 is closed.

Figure 19:
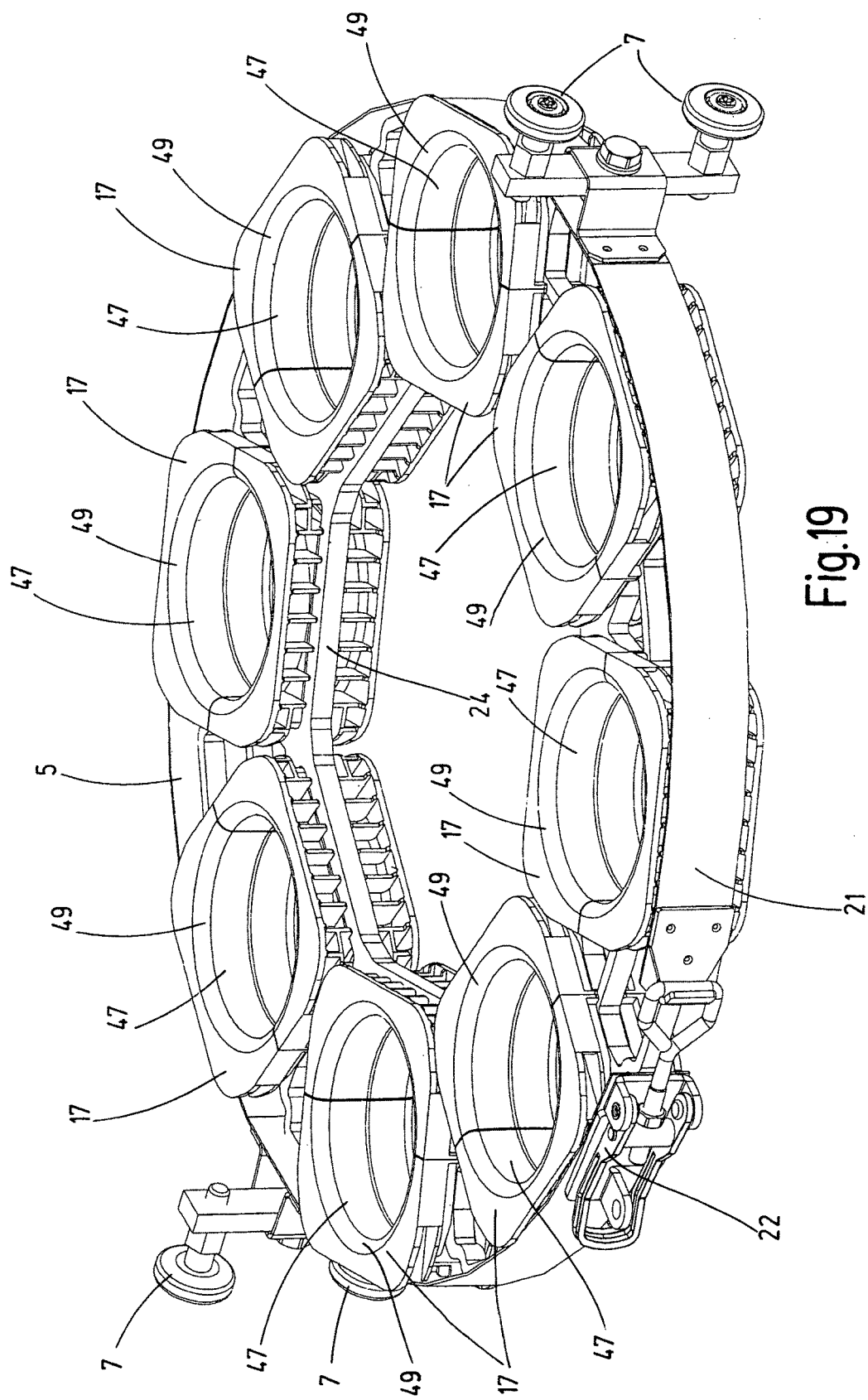
FIG. 19 is a perspective view of a base body according to a ninth exemplary embodiment of the invention, similar to that of FIGS. 5 and 10.

FIG. 19 shows this exemplary embodiment without inserted bundle elements, with the bushings 17 in the closed state. The bushings 17 are arranged along the perimeter of base body 5. The assembly is held together by a locking strap 21 placed around the outside, as per the example shown in FIG. 3. The locking strap 21 in the present example can be closed or opened through a quick-release fastener 22 without using tools.

Figure 20:
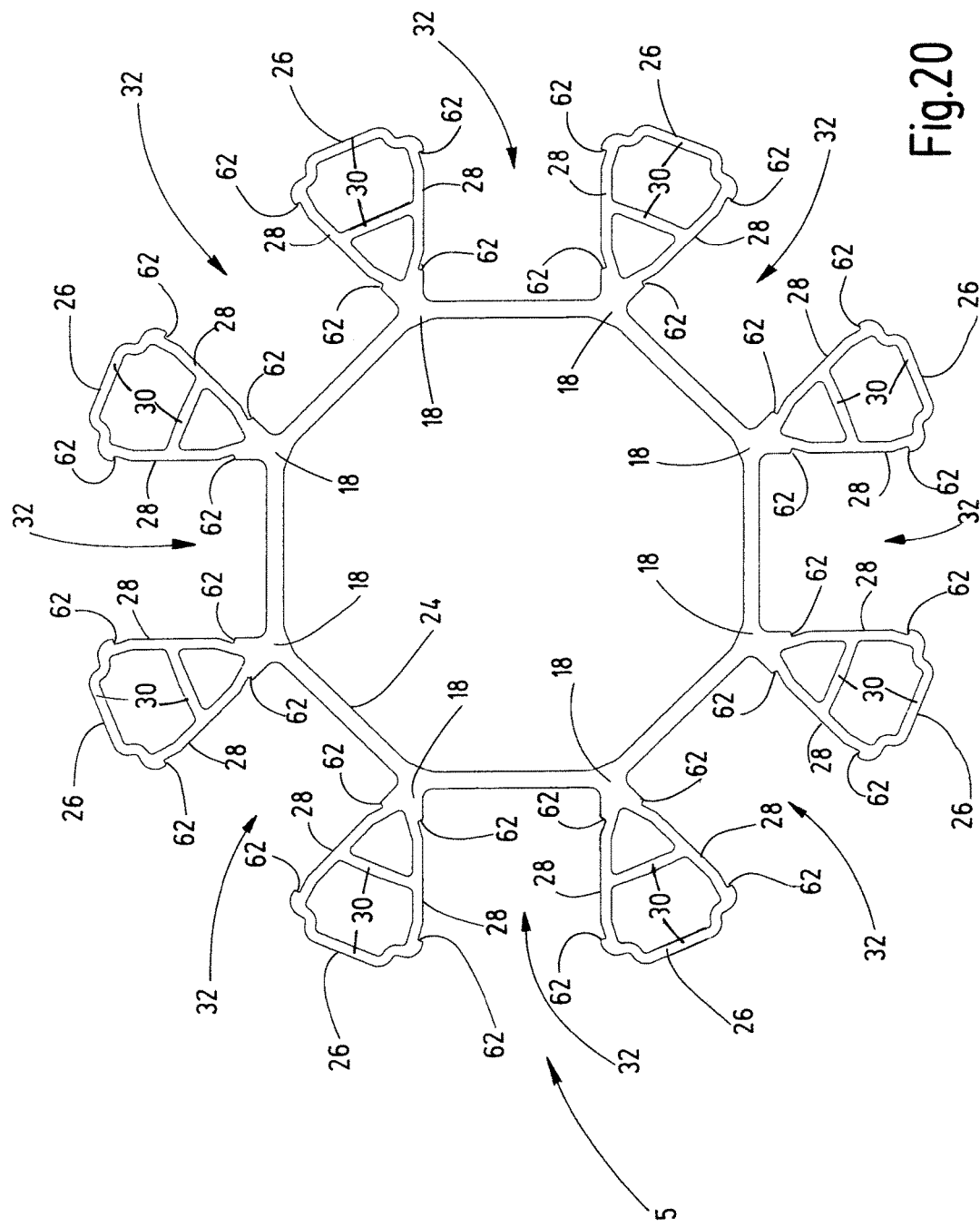
FIG. 20 is a plan view of the base body of the exemplary embodiment of FIG. 19 shown separately without bushings inserted.

The FIG. 20 shows the base body 5 separately without inserted bushings 17. The base body 5 is designed as a star-shaped body, preferably made from injection-molded metal alloy. The base body 5 comprises an internally located, non-circular ring element 24, presently in the form of an octahedron. An attachment 26 extends radially from each of the eight corners 18, away from the center of the ring element 24. The attachments 26 are approximately triangular in shape, each with two arms 28 extending from the corners 18. The arms 28 are connected to each other through braces 30 at their radially outer ends and in a center section. The arms 28 of adjacent attachments 26 extend parallel to each other and demarcate between them and the ring element 24 a holding fixture 32 for a bushing 17 to be inserted there.

Figure 21:
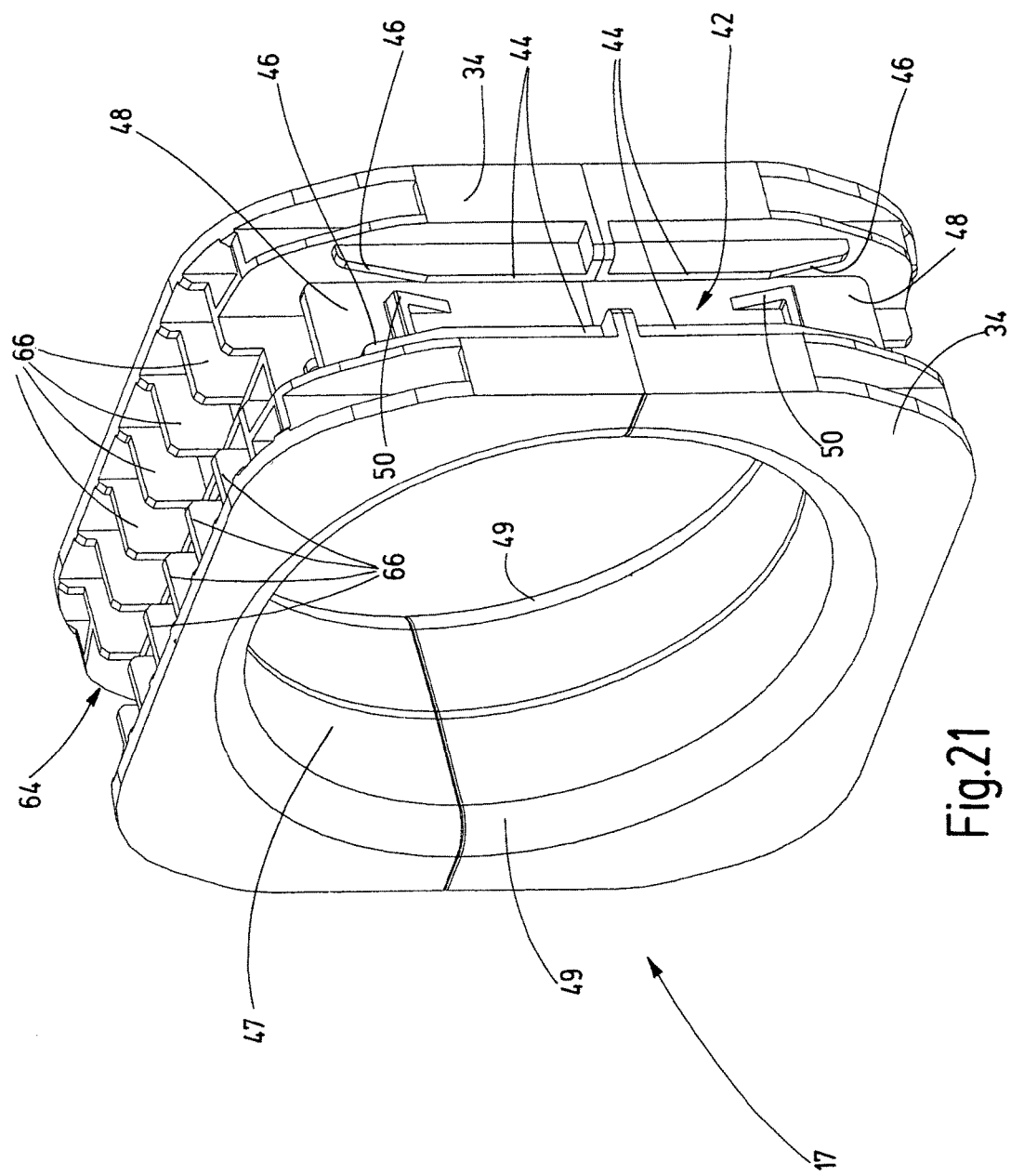
FIG. 21 is an enlarged perspective view of a single bushing of FIG. 19.
Figure 22:
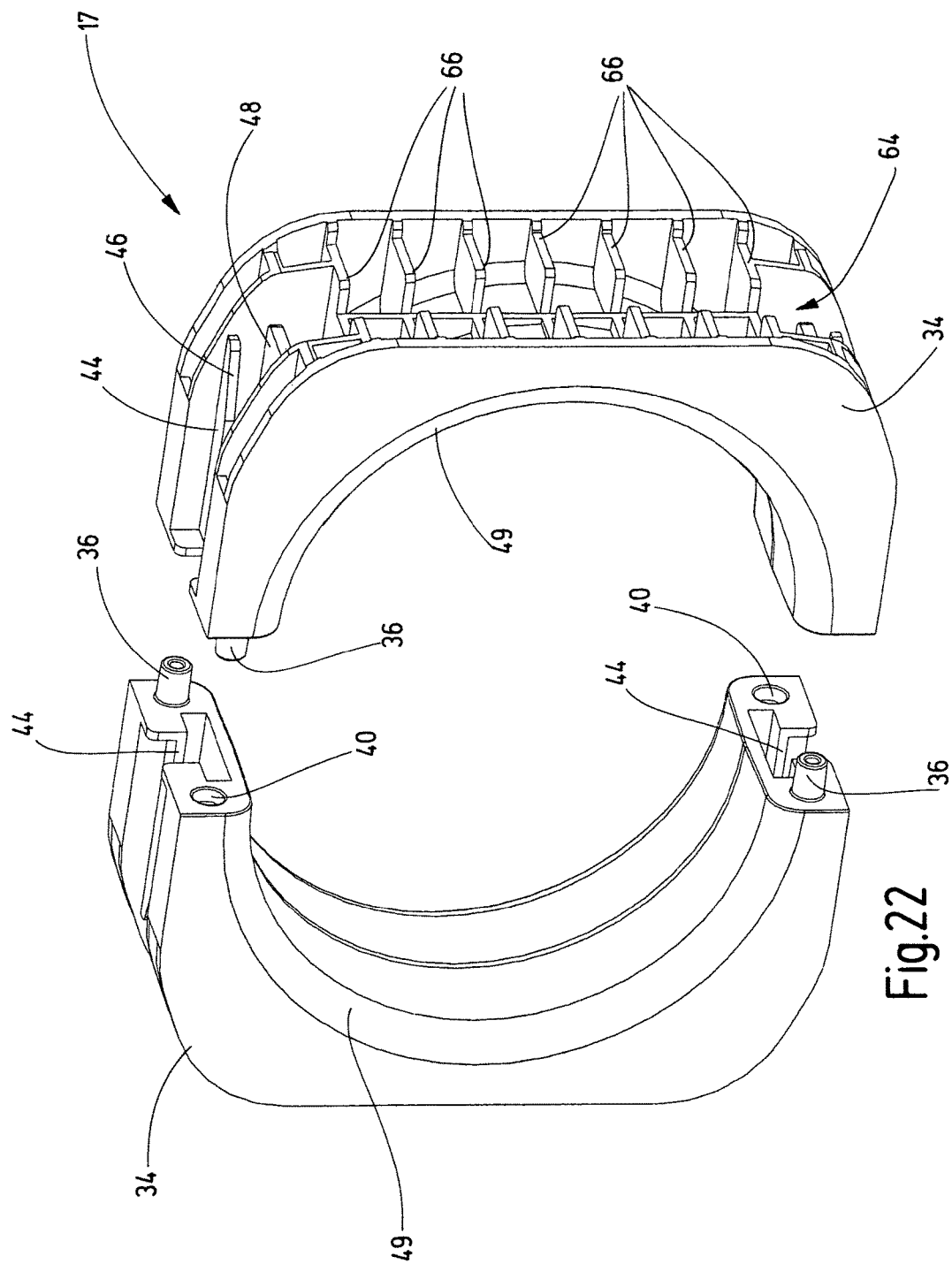
FIG. 22 is a perspective view of the bushing of FIG. 21 in which the two partial bodies of the bushing are pulled apart.
Figure 23:
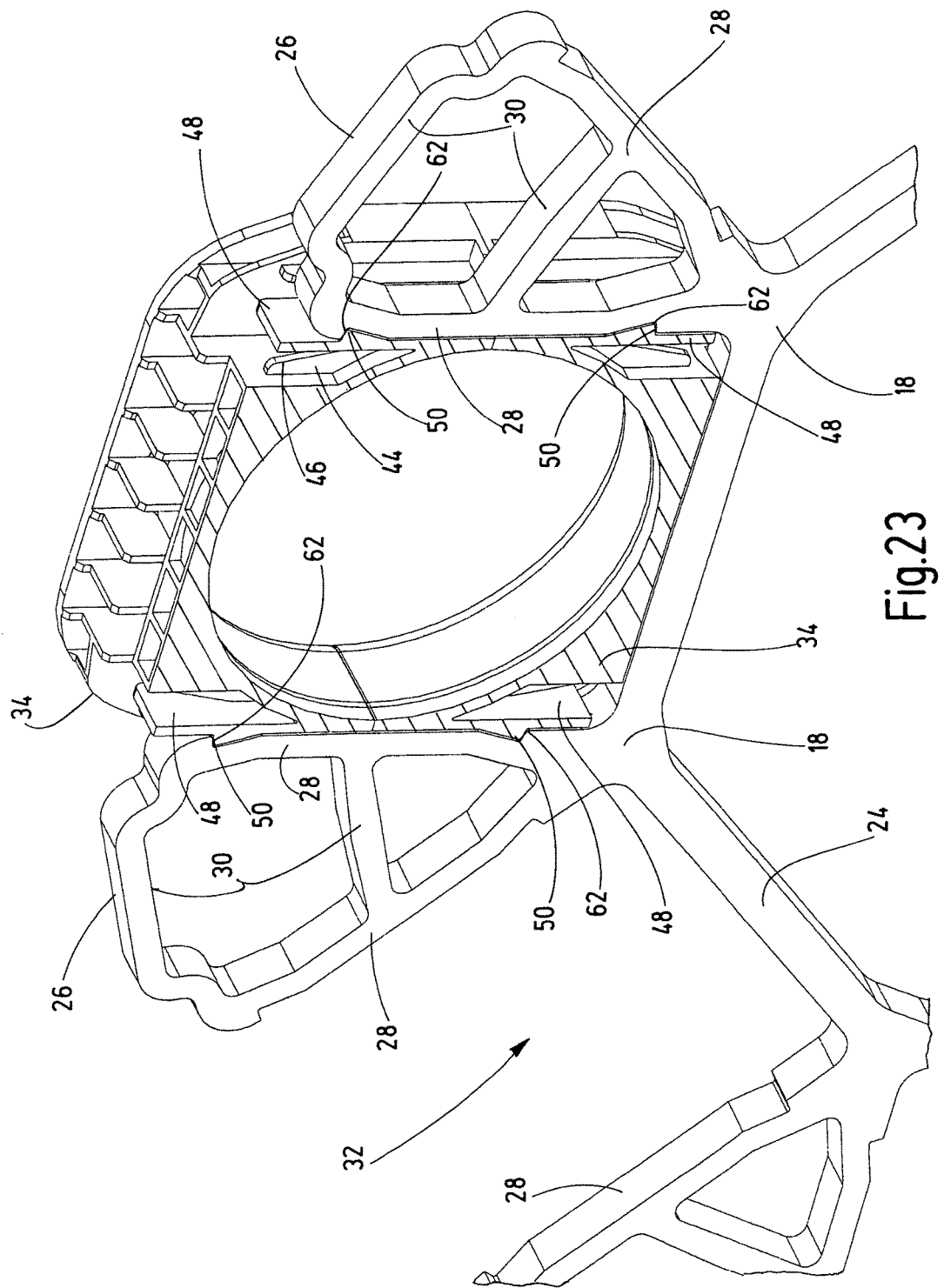
FIG. 23 is a partial, perspective view in partial section, drawn to the same scale as FIGS. 21 and 22, showing a bushing inserted into a holding fixture of the base body in the embodiment of FIG. 19.

The FIGS. 21 to 23 show the bushings 17 in greater detail. Each bushing 17 has two partial bodies 34 that are injection-molded from plastic as identical parts. Every partial body 34 forms a clamp which, in a closed position, as shown in FIG. 21, forms one half of the opening 47, which is the bundle passage. In the closed position, as shown in FIG. 22, the pins 36 and the bore holes 40 engage at their respective contact surface. This structure provides mutual guidance to compensate for manufacturing tolerances. On the two sides that are facing the arms 28 when the partial bodies 34 are inserted into the holding fixture 32 in operating position, the partial bodies 34 each form a channel 42 (see FIG. 21) laterally delimited by guiding rails 44. When inserting the bushings 17 into the holding fixtures 32, the respective arm 28 of the attachment 26 of base body 5 is received in the respective channel 42. Bevels 46 at the end of the guiding rails 44 facilitate the sliding of the bushings 17 onto the arms 28. A flexible latching clasp 48 is formed inside each of the channels 42 on each partial body 34. A catch 50 protruding to the outside is located in close proximity to the flexible, free end of the latching clasp 48. As can be seen from FIG. 20, and in particular from FIG. 23, each catch 50 is provided to interact with latching grooves 62 located on the arms 28 of the attachments 26 of base body 5. A channel 64, which is laterally bounded by a rib structure 66, is also formed on the other sides for the engagement of the ring element 24 of base body 5, as shown in FIG. 21, top and bottom, and in FIG. 22 on the side.

For the installation of the bushings 17 in this design, a partial body 34 is pushed onto the respective arms 28, where that partial body 34 interlocks with the latching grooves 62 that are adjacent to annular body 24, and is thus already prevented from slipping out. The bundle elements can now be inserted easily from the outside. The second partial body 34 is subsequently pushed onto the arms 28 to close the opening 47, which causes the locking of the outer latching grooves 62, thus preventing the bundle elements from falling out of the holding fixtures 32. To completely secure the thus formed unit, a locking strap 21 can be placed around the outside and secured by way of the quick-release fastener 22. As shown in FIG. 19, the rollers 7 in this exemplary embodiment that are provided for guidance in the runners 9 in the tower are, differently to the above described examples, not attached to the base body 5, but are attached to the locking strap 21.

While various embodiments have been chosen to illustrate the invention, it will be understood by those skilled in the art that various changes and modifications can be made therein without departing from the scope of the invention as defined in the claims.

The invention claimed is:

1. An apparatus for routing cables in a wind turbine, comprising:
   a base body; and
   multiple bushings distributed on said base body, each of said bushing having a guide receiving a cable located in each of said bushings to move freely relative to a part of the respective bushing surrounding the respective guide in both longitudinal directions of the respective cable, each said guide being a needle bearing having an inner ring surrounding the respective cable passing through the respective inner ring and having an outer ring fixed to said base body.

2. An apparatus according to claim 1 wherein said base body has a circular outline.

3. An apparatus for routing cables in a wind turbine, comprising:
   a base body; and
   multiple bushings distributed on said base body, each of said bushing having a guide receiving a cable located in each of said bushings to move freely relative a part of the respective bushing surrounding the respective guide in both longitudinal directions of the respective cable, each said guide including rotatable, cylindrical roller bodies arranged on said base body, said roller bodies of each said guide forming a lateral boundary of a passage through the respective bushing and directly contacting the respective cable in the respective guide.

4. An apparatus according to claim 3 wherein said base body has a circular outline, with said roller bodies having longitudinal axis parallel to a plane of said base body.

5. An apparatus for routing cables in a wind turbine, comprising:
   a base body; and
   multiple bushings distributed on said base body, each of said bushing having a guide receiving a cable located in each of said bushings to move freely relative to a part of the respective bushing surrounding the respective guide in both longitudinal directions of the respective cable and having two partial bodies delimiting an opening of a passage therethrough for receiving the respective cable, each said opening allowing insertion of the respective cable in the respective passage laterally relative to a longitudinal axis thereof, said two partial bodies of each said bushing being snap fit lockable in a holding fixture in a position closing the respective opening.

6. An apparatus according to claim 5 wherein said partial bodies are identical.

7. An apparatus according to claim 5 wherein a locking strap secures said bushings inside said holding fixtures by surrounding a circumference of said base body and presses said partial bodies located radially outside against said partial bodies located radially inside and mated with said partial bodies located radially outside.

8. An apparatus according to claim 7 wherein radially protruding rollers are attached to said locking strap at diametrically opposed sides thereof.

9. An apparatus according to claim 5 wherein
each said holding fixture comprises pairs of laterally spaced arms extending radially on said base body and defining a space between each of said pairs receiving the respective bushing;
each of said arms have two radially spaced arm latch members, each said latch member engaging a mating a body latch member on a side of each said partial body.

10. An apparatus according to claim 9 wherein
said arm latch members comprise grooves; and
said body latch members comprise lateral protrusions that are resiliently deformable.

11. An apparatus according to claim 9 wherein
said arms fit in grooves in the sides of said partial bodies.

12. An apparatus for routing cables in a wind turbine, comprising:
a base body;
multiple bushings distributed on said base body, each of said bushing having a guide receiving a cable located in each of said bushings to move freely relative to a part of the respective bushing surrounding the respective guide in both longitudinal directions of the respective cable;
a locking strap surrounding said base body and said bushings; and
radially protruding rollers are attached to said locking strap at diametrically opposed sides thereof.

13. An apparatus for routing cables in a wind turbine, comprising:
a vertically movable base body;
multiple bushings distributed on said base body, each of said bushing having a guide receiving a cable located in each of said bushings to move freely relative to a part of the respective bushing surrounding the respective guide in both longitudinal directions of the respective cable; and
radially protruding sliders on an edge of said base body at diametrically opposed locations on said base body, said sliders being guided in vertical runners inside a tower.

14. An apparatus according to claim 13 wherein
said base body has a circular outline.

* * * * *